Jan. 3, 1956   C. J. DE GRAVE, JR., ET AL   2,729,154
FOCUSING LENS MOUNTING
Filed Dec. 10, 1954   3 Sheets-Sheet 1

INVENTORS
CHARLES J. DeGRAVE, JR.
AND
BY OLIN W. BOUGHTON
ATTORNEY

INVENTORS
CHARLES J. DeGRAVE JR.
AND
OLIN W. BOUGHTON
BY
ATTORNEY

Jan. 3, 1956  C. J. DE GRAVE, JR., ET AL  2,729,154
FOCUSING LENS MOUNTING
Filed Dec. 10, 1954
3 Sheets-Sheet 3

INVENTORS
CHARLES J. DeGRAVE JR.
AND
BY OLIN W. BOUGHTON
ATTORNEY

United States Patent Office 2,729,154
Patented Jan. 3, 1956

2,729,154

FOCUSING LENS MOUNTING

Charles J. De Grave, Jr., Chili, and Olin W. Boughton, Canandaigua, N. Y., assignors to Bausch & Lomb Optical Company, Rochester, N. Y., a corporation of New York Application December 10, 1954, Serial No. 474,404

6 Claims. (Cl. 95—45)

This invention relates to a lens mounting of the focusing type and more particularly it relates to such a mounting for an anamorphosing lens system of the kind which is used on cinematographic cameras and the like and embodies an objective and a plurality of relatively movable cylindrical lens elements.

In such a mounting, it is essential that the axes of the cylindrical lenses coincide with a single vertical axial plane within very close limits so as to avoid distortion of the image formed thereby. This requirement is complicated in the focusing type of mount for multiple cylindrical lens elements because the axes of the cylindrical lenses must remain substantially perfectly aligned for all relative focal positions thereof and must be accurately focusable by differential motion mechanisms that are connected to the separate parts of the lens system, thus necessitating the use of high precision slide and actuating mechanism.

An object of this invention is to provide an improved focusing type of mounting for an anamorphosing lens system of the above-mentioned kind in which the lens elements are supported in substantially perfect optical alignment for all focusing positions thereof.

Another object is to provide such a mounting in which precise differential focusing movements are simultaneously tranmitted from a single actuating means to the different focusing parts of the mounting.

A further object is to provide such a mounting in which the combination of mounting and focusing mechanism is particularly adapted for moving the camera objective and an element of the anamorphosing lens in the same manner during focusing and the operating mechanism for the diaphragm in said objective is adapted for remote operation.

A still further object is to provide such a device in which the operating mechanism is enclosed and protected from misuse and entrance of foreign matter, is simple and sturdy in construction and may be operated with equal facility from a single station at either side of the camera.

Figure 1:
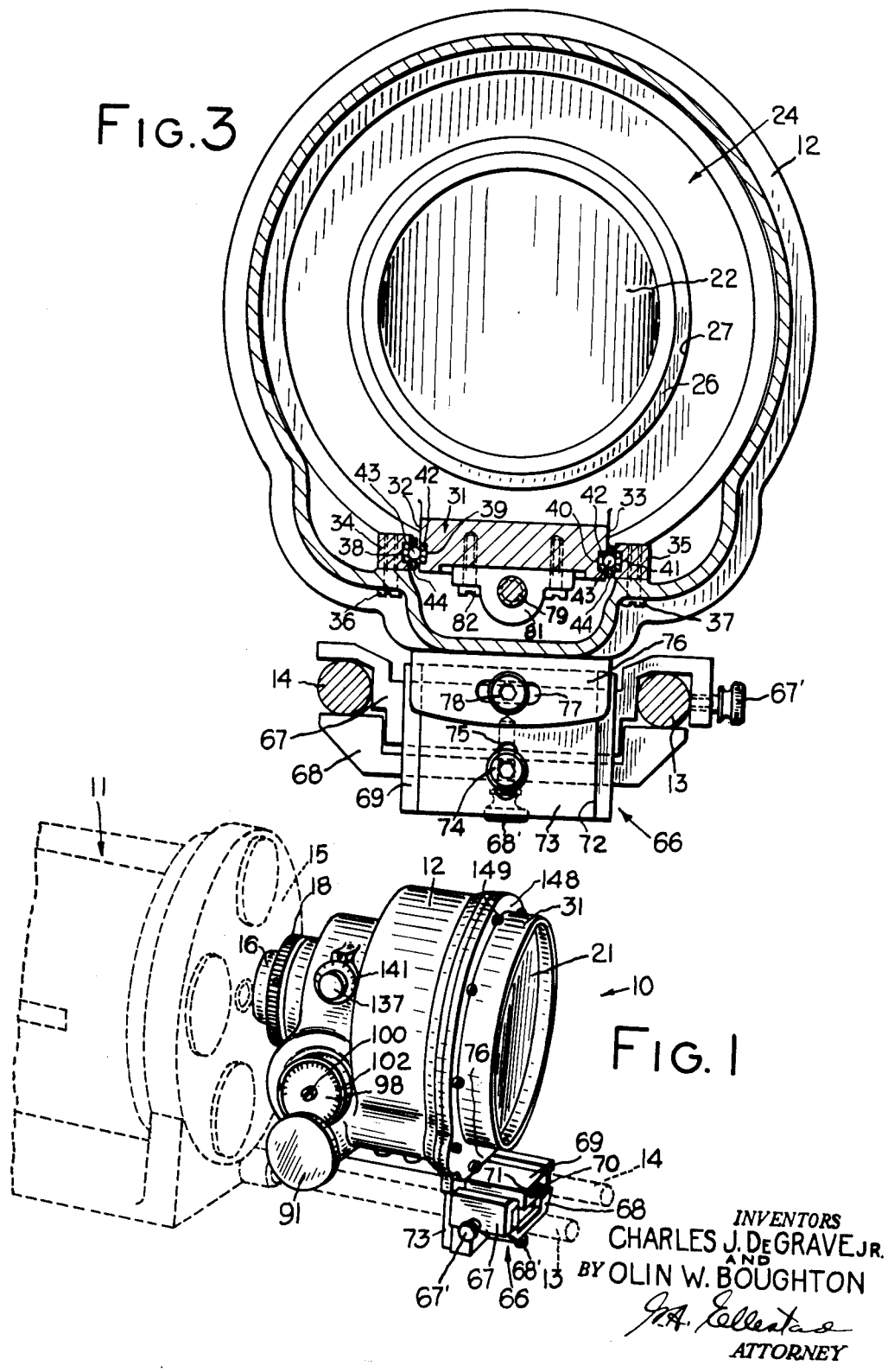
Figure 2:
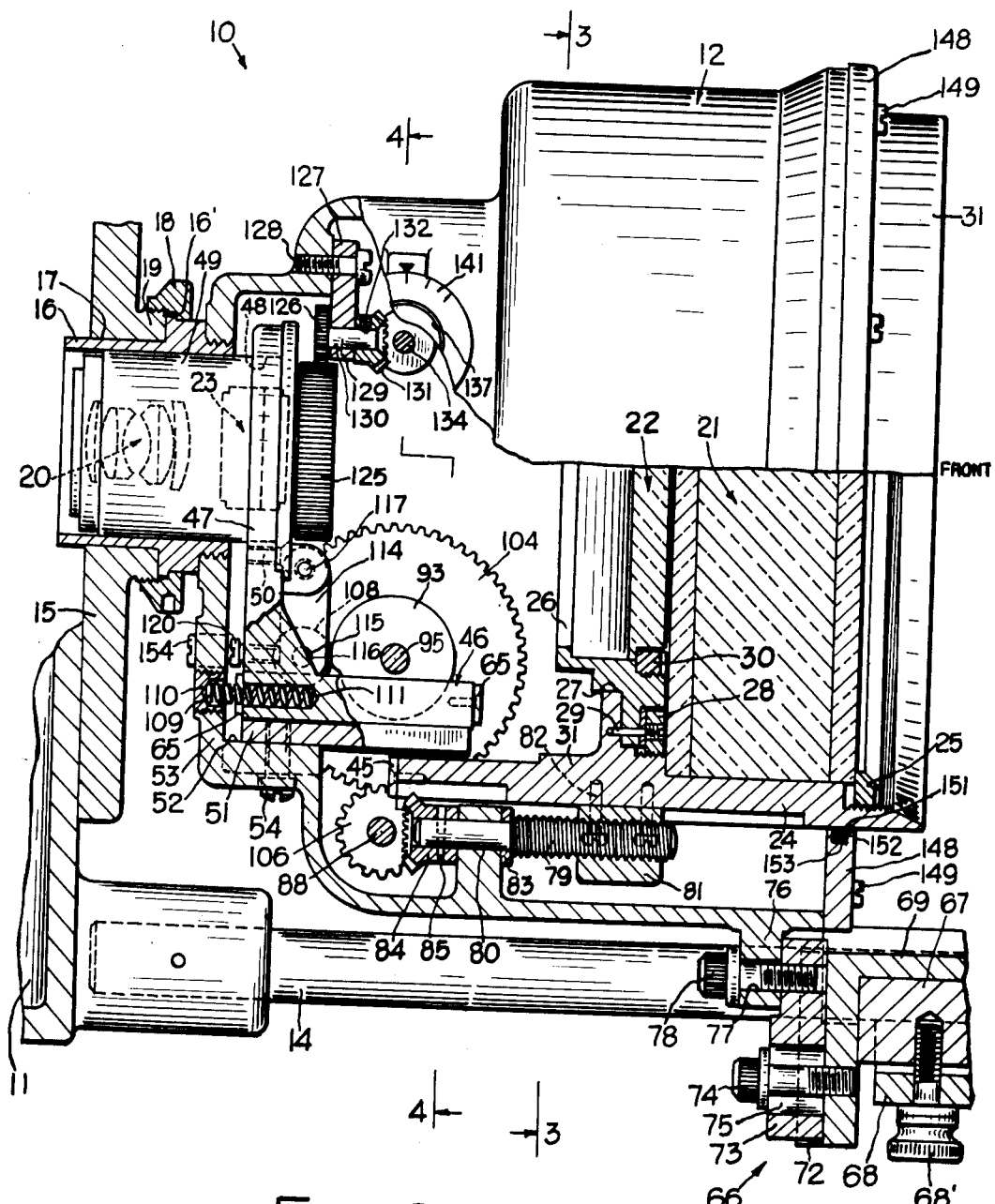
Figure 4:
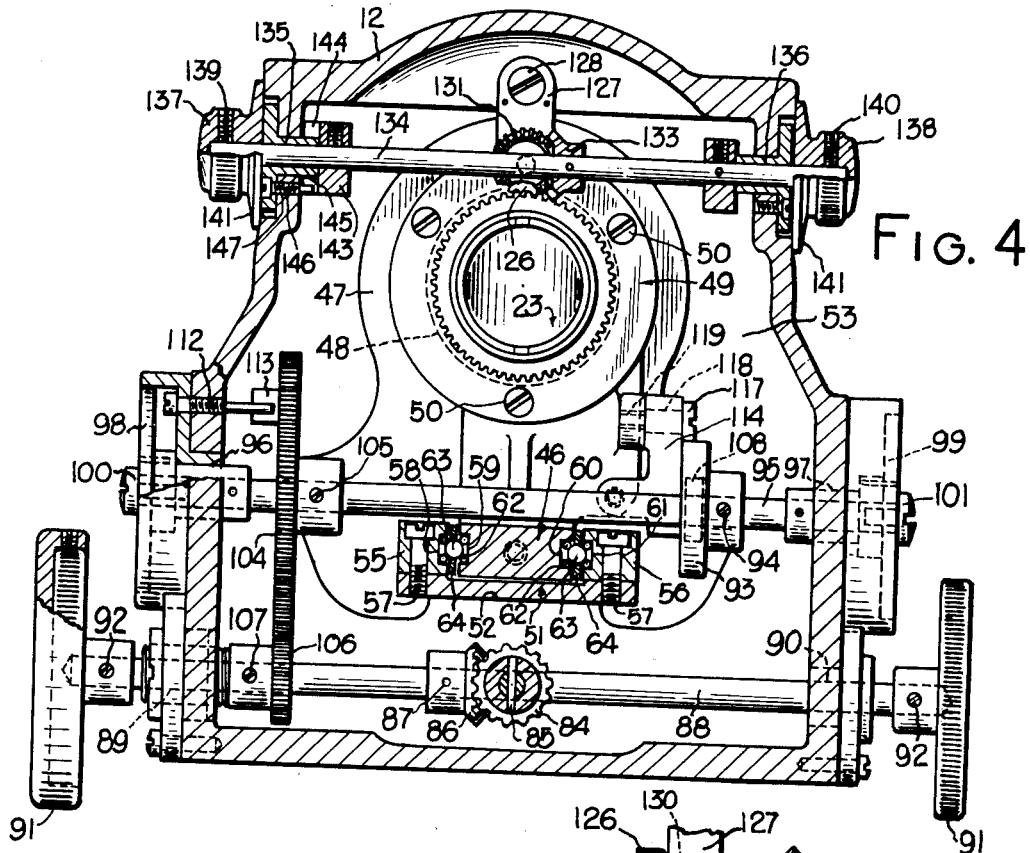
Figure 5:
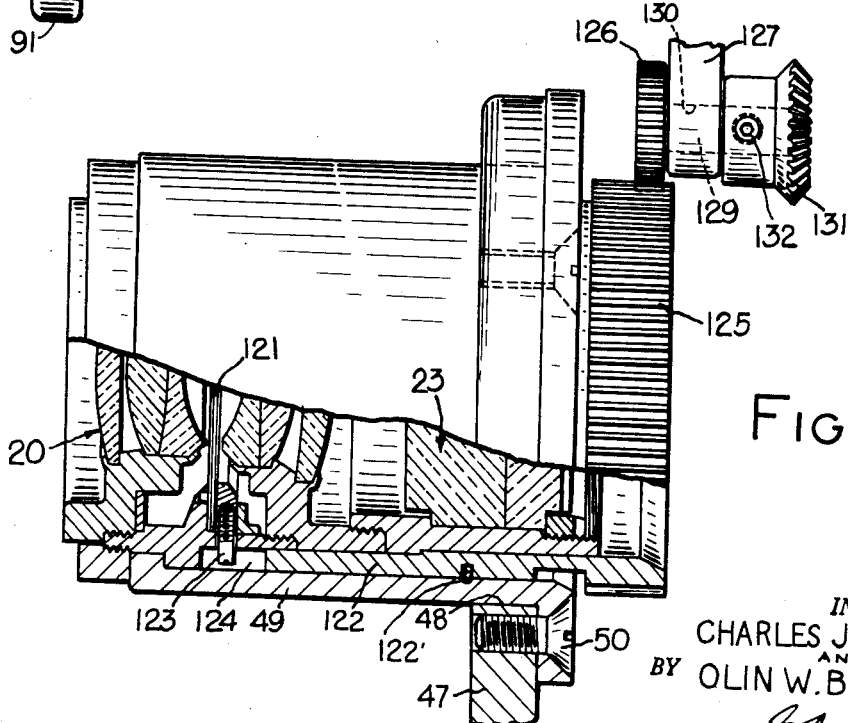

Further objects and advantages reside in certain novel features of construction, arrangements and combinations of parts which will hereinafetr be more fully described in the specification herebelow and shown in the accompanying drawings in which, Fig. 1 is a perspective view, drawn to a reduced scale, of a preferred form of my invention, Fig. 2 is a vertical sectional view of same, with parts shown in side elevation, Fig. 3 is a cross-sectional view taken on the line 3—3 of Fig. 2, Fig. 4 is a cross-sectional view taken on the line 4—4 of Fig. 2, and Fig. 5 is a detailed side view, partly broken away and shown in section, of certain operating parts in the rear of the mounting.

A preferred embodiment of my invention is shown in the drawings wherein the lens system and mount are generally shown at 10 in Fig. 1 as an attachment for a cinematographic camera 11. The mount comprises a casing 12 supported at its front end on two longitudinally extending support rods 13 and 14, which are suitably anchored in a lens board 15 in the camera 11, and supported at its rear end by an extension 16 which is suitably fixed to the casing 12 and slidably fits an opening 17 in said lens board, as best shown in Fig. 2. For securing the casing 12 to the lens board 15, a clamping nut 18 which is swivelly retained on the pilot sleeve 16 by the radial flange 16', is screwed onto a threaded extension 19 on the lens board.

Within the casing 12 are held a camera objective 20 in optical alignment with the anamorphosing lens which comprises a front cylindrical lens 21, an intermediate cylindrical lens 22, and a rear cylindrical lens 23, all of which are mounted for focusing motion with respect to each other and the camera 11 by slide mechanism described herebelow.

*The slide mechanism*

According to this invention, the front cylindrical lens 21 and the intermediate lens 22 are both mounted in a cylindrically shaped housing 24, the front lens being held therein by means of a clamp nut 25 which is threaded into the end of the housing to hold the lens in a conventional manner, as shown in Fig. 2. For convenience in setting the axis of the intermediate cylindrical lens 22 in exact alignment with the axis of the rear cylindrical lens 23, the lens 22 is directly mounted in a separate lens cell 26 which is held in a close fitting round opening 27 in housing 24 by a suitable clamp ring 28 threaded into the housing. For the purpose of locking the cell 26 in its correct angular adjustment, a lock pin 29 is closely fitted into holes in the cell 26 and housing 24, respectively, which are drilled after the axes of the lenses 22 and 23 are properly aligned. Said pin 29 has a threaded head thereon which engages a tapped hole in the cell clamping ring 28 to prevent the pin from being displaced. A lens retaining ring 30 threaded into the lens cell 26 is provided to hold lens 22 in said cell. Each of the cylindrical lenses 21 and 22 are cemented into their individual lens cells to prevent turning therein.

Formed on the lower portion of the lens housing 24 is a longitudinally extending slide 31 having two parallel vertical sides 32 and 33, as best shown in Figs. 2 and 3. Adjacent to these sides 32 and 33, the guide rails or slideways 34 and 35 are respectively secured to the casing 12 by any suitable means such as the screws 36 and 37 which extend through holes in the casing 12 and are threaded into said rails.

A high precision, anti-friction linear type of bearing is provided at opposite sides of the slide 31 for the purpose of obtaining substantially perfect straight line motion thereof, said bearing being partially retained in paired vertical recesses 38 and 39, and 40 and 41 formed in the adjacent sides of the rails 34 and 35 and in slide 31, respectively. In the upper and lower corners of each of said recesses are held hard metal cylindrical track rods 42, which are equally spaced from each other horizontally and vertically in square formations of four rods per set on opposite sides of the slide 31. Said track rods 42 are preferably all of the same size and each set in effect forms a pair of bearing races for retaining a row of ball bearings 43 which are spaced from each other by an apertured ball separator plate 44 lying in the clearance space between said guide rails 34 and 35 and the intervening slide 31. Bearing end plates, one of which is shown at 45 in Fig. 2, are fixed in any preferred manner across the recesses 38, 39, 40 and 41 at both ends to keep the track rods 42 and balls 43 in assembled position.

Rearwardly of and above the front slide 31, there is provided a rear slide 46 whereon the rear cylindrical lens 23 is mounted in tandem with the camera objective 20. In order to mount said objective and said cylindrical lens, the slide 46 is extended upwardly from its rear portion to form a lateral vertical bracket 47 having an opening 48 in which a flanged lens carrier tube 49 is secured by any preferred means such as the screws 50, as shown in Fig. 5. These screws extend through the flanged part of said tube and are threaded into said bracket 47.

Bearing structure similar to that of the slide 31 is provided for supporting the rear slide 46 comprising a mounting plate 51 which is secured to a horizontal ledge 52, formed adjacent to a back wall 53 of the casing 12. Two screws, one of which is shown at 54 in Fig. 2 extending through the casing and threaded into the plate 51, are used to assemble the plate to the casing. Along the opposite longitudinal edges of the mounting plate 51 are fixed a pair of guide rails 55 and 56 by means of screws 57 which extend through holes in the rails and are threaded into the plate 51. Said rails lie adjacent and parallel to the longitudinal side surfaces of slide 46 as shown in Fig. 4. Flat recesses 58 and 59 are formed in the side surfaces in opposite relation to a pair of adjacent flat recesses 60 and 61 formed in the vertical faces of the rails 55 and 56. In the upper and lower corners of each pair of recesses 58, 60 and 59, 61 are held a set of four hardened steel track rods 62 in square formation, when seen endwise, lying parallel to the longitudinal sides of the slide 46 in a manner similar to that used on slide 31. Each set of four track rods 62 serves in effect as a pair of bearing races for retaining a row of ball bearings 63 which are spaced from each other by apertured ball separator plates 64 situated in the clearance space between said guide rails 55 and 56 and slide 46. Bearing end plates 65 are removably secured to the front and rear ends of the guide rails 55 and 56 to retain both the rods 62 and balls 63 in proper assembled position.

The guide rails 34, 35 and 55, 56 and the mounting plate 51 are accurately manufactured perfectly straight and are assembled and adjusted to bring the track rods 42 and 62 into precise parallelism with each other and with the optical axis of the objective 20 so that the cylindrical axes of the cylindrical lenses 21, 22 and 23 remain exactly erect and aligned in a single vertical plane which is coincident with the optical axis of the camera during their entire focusing motion. Means for accomplishing this adjustment are provided by oversized holes in the guide rails 55, 56 for the holding screws 57 and oversized holes in the casing 12 for accommodating the mounting plate screws 51 and holding screws 36 and 37 whereby slight adjustment motions may be secured.

To facilitate horizontal and vertical adjustment of the casing 12 per se so as to secure perfect alignment with the optical axis of the camera 11, an adjustment mechanism, generally indicated by the numeral 66 in Figs. 1–3, is provided for supporting the forward end of the casing 12 on the support rods 13 and 14. Comprised in said adjustment mechanism 66 is a mounting bracket 67 seated at its opposite ends on the support rods 13 and 14 and secured to rod 13 by a clamp screw 67' as shown in Fig. 3. Bracket 67 is held down against the mounting rods 13 and 14 by a clamping bar 68 which is held against the underside of said rods by a thumb screw 68' projecting through a hole in said bar and threaded into bracket 67. At its center portion, the bracket 67 is depressed and a horizontal slide 69 is hung crosswise on this portion and is secured thereto by a clamp screw 70 extending through a horizontally elongated slot 71 in said horizontal slide and threaded into said bracket so as to permit relative horizontal adjustment thereof. In the rear side of the horizontal slide 69 is a shallow vertical channel 72 in which a vertical slide 73 is slidably fitted. A clamp screw 74 extending through an elongated vertical slot 75 formed in slide 73 is threaded into the horizontal slide 69 to secure relative vertical adjustment between slides 69 and 73.

A downwardly extending flange 76 is formed on the lower front end of casing 12 and said flange has a horizontally elongated opening 77 formed therein. The casing is connected to and supported by the vertical slide 73 by means of a clamp screw 78 extending through the opening 77 and threaded into the slide 73 so as to provide for angular or rolling adjustments to the casing. Four kinds of adjustment motions may therefore be provided for the casing 12 by the above-described mechanism 66 which are: transverse, horizontal, vertical and angular.

The differential focusing mechanism

The movement of the front cylindrical lens housing 24 on its slide 31 is accomplished by a screw shaft 79 which is rotatably journaled in a stationary longitudinal bearing 80 in casing 12. At its forward end, the screw shaft 79 is threaded into a nut 81 which is fixed in any preferred manner such as the screws 82 to the lens housing 24. To the shaft 79 on one side of the bearing 80 is suitably fixed a thrust washer 83 for taking end thrust and on the other side of the bearing, a bevel gear 84 is secured to shaft 79 by a shear pin 85. Meshing with gear 84 is a mating bevel drive gear 86 which is fixed by a shear pin 87 to an actuating shaft 88. The shaft 88 is journaled at 89 and 90 in opposite sides of the casing 12 and the ends of the shaft are extended outwardly thereof to carry focusing knobs 91 of any desired form which are fixed thereto by set screws 92 for rotation of the shaft.

For moving the rear slide 46, a radial cam 93, fixed by means of the set screw 94 onto a cam shaft 95, is provided. Shaft 95 is rotatably journaled at 96 and 97 in casing 12 and its ends are extended beyond said casing and focusing dials 98 and 99 are secured on said ends by any suitable means such as the cap screws 100 and 101. Suitable focusing dials or scales 102 and 103 are formed on the outer peripheral surfaces of said dials to indicate the various focal settings of slides 31 and 46. Rotation of the cam shaft 95 is obtained by a geared connection including a driven gear 104 fixed by means of a suitable shear pin and a set screw 105 to the cam shaft and meshing with a driving gear 106 similarly fixed by a set screw 107 and shear pin onto the actuating shaft 88. On the slide 46 is rotatably mounted a cam following roller 108, and for the purpose of urging the roller against the cam 93, a compression spring 109, seated at its front and rear ends, respectively, in a casing recess 110 and a slide recess 111, is provided as shown in Fig. 2.

By virtue of the use of the gear mechanism 104, 106, the cam 93 turns less than one revolution during the time that the nut 81 travels its entire excursion on the screw shaft 79 so that differential motions are transmitted simultaneously from the actuating shaft 88 to the respective movable slides 31 and 46. Stop means for limiting the rotation of the gear 104 to a single revolution comprises a stop screw 112 threaded through the side of the casing 12 and having an inwardly projecting smooth tip thereon which engages a protruding lug 113 formed on the side of the gear 104.

A mechanism for making axial adjustments of the objective 20 is provided by mounting the cam following roller 108 on a mounting link 114 by means of an axle stud 115 which is fixed in any desired manner at one end in a bore 116 in the link. At its upper end, the mounting link 114 is swingably supported on a pivot pin 117 which rotatably engages a smooth bore 118 in the link and is threaded into a tapped hole 119 located in the vertical bracket 47. The free end of the link 114 abuts against a regulating screw 120 which is threaded through the bracket 47 so as to protrude at both sides far enough to contact the link and allow for some adjustment motion thereof. Regulating screw 120 is locked by any preferred mechanism, not shown, against rotation.

*The diaphragm operating mechanism*

The objective 20 is provided with an iris diaphragm 121, as best shown in Fig. 5, which is operatively connected to a diaphragm operating sleeve 122 that is rotatably fitted into the lens carrier tube 49 and is held therein by an expansible spring lock wire 122' positioned in adjacent grooves in the sleeve and carrier. The operative connection thereto comprises a pin 123 which is fixed radially in any suitable manner such as threading into the diaphragm 121 and is engaged at its free end in a slot 124 in the end of the diaphragm operating sleeve 122. Said sleeve is extended at its forward end beyond the carrier tube 49 and a spur gear 125 is formed on the extended portion. Since the objective assembly requires focusing movement for its operation, the spur gear 125 is elongated and a narrower stationary pinion 126 is provided to drive said gear. On the inside of the casing 12, a pinion bracket 127 is held in any preferred manner such as the screw 128 which is threaded into the casing. A pinion shaft 129, carrying pinion 126, is rotatably journaled in a smooth bore 130 extending through the bottom of said bracket and a bevel gear 131 is suitably fixed on the forward end thereof by a set screw 132 and a shear pin not shown. A mating bevel gear 133, fixedly mounted in a similar manner on a diaphragm regulating shaft 134, is provided for the driving gear 131. Shaft 134 is rotatably journaled at 135, 136 in the casing 12. For the purpose of rotating the shaft 134, it is extended beyond the journals 135, 136 at both ends and actuating knobs 137 and 138 are held thereon by the set screws 139 and 140. Suitable diaphragm scales as shown at 141 in Fig. 1 are carried on the outer surfaces of the knobs 137 and 138 to enable the operator to set the diaphragm. A rotation stop for limiting to about one-half a turn the angular movement of the diaphragm shaft 134 is provided by a circular collar 143 having one side cut away and recessed to form a pair of stop shoulders 144 and 145. Projecting into abutting relation with said shoulders is a stop pin 146 having a threaded shank which is screwed into a tapped hole 147 in the casing 12.

For the protection of the slide and actuating mechanisms from damage by foreign matter such as dust and moisture, a cover 148 is fitted and removably secured to the front of the casing 12 in any preferred manner such as the screws 149. The cover 148 has an opening 151 in which the cylindrical protruding end of the lens housing 24 fits freely so as to allow the housing to slide easily through the opening during focusing. For sealing the clearance space between the cover 148 and housing 24, a suitable resilient sealer ring 152 is snugly set into a peripheral groove 153 formed around the opening 151 in said cover, the ring being so fitted therein as to bear resiliently against said housing.

*Assembly*

When assembling the parts of the lens attachment 10, the objective 20 and the cylindrical lens 23 together with the diaphragm 121 and its operating sleeve 122 are assembled in an obvious manner within the lens carrier tube 49, said sleeve being locked therein by the lock wire 122'. After checking the operation of this group of parts, it is set into the opening 48 in the bracket 47 and is secured thereto by the screws 50. With the objective 20 and the cylindrical lens 23 and their associated parts thus assembled, the guide rails 55 and 56 are secured in place at either side of the slide 46 by the holding screws 57. The linear bearings are then assembled starting with the placement of the track rods 62 in the corners of the recesses 58 to 61 inclusive. When the tracks are in place, they are held there by inserting the balls 63 together with the ball retainers 64 and the guide rails 55 and 56 are pressed toward each other while the attachment screws 57 are tightened into the plate 51. Before the guide rails 55 and 56 and the mounting plate 51 are finally tightened in place, the optical alignment of the objective 20 and cylindrical lens 23 is checked and adjusted. The lens 23 is set with its axis perpendicular to a plane which touches the rails 55 and 56 and is then cemented to secure it at that position. By moving the rails and mounting plate within the range of adjustment afforded by the respective clearance holes through which their respective screws extend, the entire subassembly of lenses is adjusted with respect to its alignment in the camera 11. End plates 65 are finally attached to the slide 46 to cover the ends of the track rods 62.

The lens cell 26 is then set into the opening 27 in the housing 24 and is secured therein by the clamp ring 28. The front slide 31 is assembled to its guide rails 34 and 35 and bearing mechanism 42, 43, in a manner similar to that above described for the bearing structure of the rear slide 46, the rail holding screws being only tentatively tightened to permit aligning adjustments. In the lens cell 26, the cylindrical lens 22 is cemented against rotation therein and is secured by the clamp ring 30. The axis of lens 22 is aligned with the axis of the cylindrical lens 23 as exactly as possible and cemented in this position, then the retaining ring 28 is screwed up against the lens cell. To lock the cell against rotation in the opening 27, the lock pin 29 is fitted into a radially aligned hole in the slide 31 after the alignment is correctly adjusted. Lastly, lens 21 is assembled into the upper part of the slide 24 and is clamped therein, after its cylindrical axis is properly oriented, by the clamp ring 25. Then the parfocalizing adjustments may be made for the objective 20, and these adjustments may be made without reopening the casing 12 by inserting a screw driver through a hole, which is normally closed by a screw plug 154, and turning the regulating screw 120.

It is noteworthy that all of the necessary optical adjustments, such as focusing and diaphragming, for both the photographic objective and the anamorphosing lens system may be accomplished quickly and conveniently by controls that are located on the exterior of opposite sides of the anamorphosing attachment. Of still greater advantage is the fact that although the different optical parts of the anamorphosing system require different simultaneous focusing motions, only a single control is necessary therefor when using our invention. By employing precision slide mechanisms which are perfectly straight, free from shake in any of the operational positions and are strictly parallel to each other, the axes of the cylindrical lenses carried thereby will remain in perfect optical longitudinal and angular alignment with each other and with the camera objective in any of their focusing positions. It is further pointed out that the assembly of the camera objective and the rear cylindrical lens together in an integral carrier tube not only assures perfect optical alignment between the two members and compact construction but also facilitates the construction of actuating means for the diaphragm.

Although only a preferred embodiment of our invention has been shown and described in detail, other embodiments are possible and changes may be made in the form and arrangement of the parts thereof without departing from the spirit of this invention as defined in the claims herebelow.

We claim:

1. A focusing lens mount for holding a plurality of anamorphosing cylindrical lens elements in alignment with a camera objective comprising a casing, a longitudinally movable slide held in said casing whereon a first portion of said elements is fixedly mounted, means including a first pair of parallel guideways fixed longitudinally within said casing and slidably fitted to opposite sides of said slide for supporting it, a second longitudinally movable slide located above and rearwardly of the first slide whereon the remaining portion of said lens elements is fixedly mounted in optical alignment with the first portion of elements, and a second pair of parallel guideways fixed longitudinally in said casing parallel to the first pair of guideways and slidably fitted to the opposite sides of the second slide to support it, means for holding the first and second slides parallel to each other, means for moving each slide, and adjustment means including a vertically and horizontally adjustable connection between said camera objective and the front of said casing for effecting parallelism between said guideways and the optical axis of said camera objective whereby the axes of said elements are held in precise optical alignment with each other and in substantial coincidence with an axial vertical plane which includes the optical axis of said objective for all focusing positions of said elements.

2. A focusing lens mount for holding a plurality of anamorphosing cylindrical lens elements in alignment with a camera objective comprising a casing, a longitudinally movable slide held in said casing whereon a portion of said elements is mounted, a pair of parallel guide rails fixed longitudinally in said casing in supporting relation and adjacent to the opposite longitudinal sides of said slide, the adjacent surfaces of said slide and said rails being spaced apart and having oppositely aligned recesses formed therein to accommodate precision anti-friction linear bearings on which the slide rests, a second longitudinally movable slide located in the casing rearwardly of and above the first slide for carrying the remainder of said lens elements, a second pair of guide rails fixed longitudinally in said casing closely adjacent to and spaced from the opposite sides of the second slide, the second slide and its guide rails having aligned recesses in their adjacent sides wherein a pair of linear bearings are seated, said bearings for both of said slides including a group of four cylindrical mutually parallel track rods seated in a square formation in the adjacent recesses at either side of each slide and further including a row of balls spaced from the walls of the recesses and contacting and retained by the aforesaid group of track rods so as to support their respective slides, means for adjusting one slide into precise parallelism with the other slide, means for moving each said slide, and adjustable support means cooperatively formed on said casing and camera for holding said track rods parallel to the optical axis of said camera objective whereby the axis of each of said cylindrical lens elements is maintained in a single vertical plane which is substantially coincident with the optical axis of the objective and the camera for all focusing positions thereof.

3. A focusing lens mount for holding a plurality of anamorphosing cylindrical lens elements in alignment with a camera objective comprising a casing having attachment means thereon for connecting it to a camera lens board in alignment with the optical axis of the objective, a horizontal ledge formed interiorly in the lower part of said casing, a mounting plate fixed to said horizontal ledge, a pair of evenly spaced slideways and means for adjustably securing the slideways to said plate longitudinally of said casing, a focusing slide on which said objective is carried, said slide having bearing means thereon for slidably mounting it on said slideways, a vertical wall formed transversely on said slide and extending upwardly across said optical axis in spaced relation to the back wall of said casing, the vertical wall having an opening therein substantially centered on said optical axis, a horizontal mounting tube in which said objective and said cylindrical lens elements are held in optical alignment with each other, and securing means cooperatively formed on said tube and vertical wall to hold said tube rigidly in said opening in said wall whereby the objective and cylindrical lens elements may be optically aligned with each other and with the axis of the camera for all focusing positions of the lens elements and objective.

4. A focusing lens mount for holding a plurality of anamorphosing cylindrical lens elements in optical alignment with a camera objective comprising the combination of a casing having attachment means for coupling it to a camera, a front slide and a rear slide, a portion of said lens elements being mounted on each slide, longitudinal track means fixed to the casing and extending adjacent to the longitudinal sides of the front and rear slides in parallel relation to the optical axis of the objective, said means including slidable cooperating bearing means formed on the contiguous parts of said means and slides for supporting the lens elements carried by the slides in optical alignment with said objective with the cylindrical axes of said lens elements erect, and differential focusing mechanism for simultaneously moving the front and rear slides at different rates of motion, said mechanism including a stationary focusing screw rotatably mounted longitudinally in the casing and threaded into the front side, a cam rotatably mounted in said casing in contact with a front surface on the rear slide, a rotatably journaled cam shaft whereon the cam is fixed, resilient means carried by said casing and pressing against a rear surface of the rear slide to urge it against the cam, an operating shaft journaled in and protruding outside of the casing so that it may be turned from the exterior, and geared connections of different ratios operatively connected between the operating shaft and said screw and between the operating shaft and the cam shaft whereby differential focusing is effected.

5. In a focusing lens mount for holding a plurality of anamorphosing cylindrical lens elements in optical alignment with a camera objective, the combination of a casing secured to said camera for housing said objective and said elements, a slide mounted for longitudinal motion in the lower part of the casing and means for mounting said slide including a pair of coplanar guide bars extending along opposite sides of said slide and having a gliding connection therewith, said bars being fixed parallel to the axis of the camera within said casing, a transverse supporting wall extending erectly from the slide across the center portion of the casing and having an opening therein which is substantially concentric with said objective, focusing means for moving said slide along said guide bars, a rearwardly extending lens carrier tube secured coaxially with said opening in said wall so as to move with said slide, said objective and a portion of said cylindrical lens elements being mounted in said tube in optical alignment with each other, and means for adjusting the axial alignment of said carrier tube to bring it into axial coincidence with the optical axis of the camera whereby alignment of the axes of the individual cylindrical elements of the optical system with respect to each other and with respect to the optical axis of the objective and the camera is assured for all focal positions of said elements.

6. In a focusing lens mount for holding a plurality of anamorphosing cylindrical lens elements in optical alignment with a camera objective, the combination of a casing which is secured to said camera for housing said objective and said elements, a slide mounted for longitudinal motion in the lower part of the casing and means for mounting said slide including a pair of coplanar guide bars extending along opposite sides of said slide and having a sliding connection therewith, said bars being fixed parallel to the optical axis of the camera within said casing, a transverse supporting wall extending erectly from the slide across the center portion of the interior of the casing and having an opening therein which is substantially concentric with said objective, focusing means for moving said slide along said guide bars, a rearwardly extending lens carrier tube secured coaxially in the opening in said wall so as to move with said slide, means for retaining said objective and said cylindrical lens elements in said tube in optical alignment with each other, a diaphragm in said objective, means including an actuating sleeve rotatably mounted in said tube and operatively connected to said diaphragm for its operation, the foremost part of said sleeve having a cylindrical head formed thereon which protrudes forwardly of said wall, a stationary operating shaft journaled in said casing near said head, and an axially movable geared connection between said head and operating shaft whereby said diaphragm may be remotely operated from said operating shaft by enclosed and protected mechanism regardless of the focusing motion of the objective holding tube with respect to the operating shaft.

No references cited.